(12) United States Patent
Verma

(10) Patent No.: US 10,178,920 B2
(45) Date of Patent: Jan. 15, 2019

(54) PILLOWCASE CHANGING DEVICE

(71) Applicant: Vandana Verma, Houston, TX (US)

(72) Inventor: Vandana Verma, Houston, TX (US)

( * ) Notice: Subject to any disclaimer, the term of this patent is extended or adjusted under 35 U.S.C. 154(b) by 281 days.

(21) Appl. No.: 15/286,916

(22) Filed: Oct. 6, 2016

(65) Prior Publication Data
US 2018/0098646 A1    Apr. 12, 2018

(51) Int. Cl.
*A47G 9/02* (2006.01)
*B25J 15/00* (2006.01)

(52) U.S. Cl.
CPC ........ *A47G 9/0253* (2013.01); *B25J 15/0028* (2013.01); *A47G 9/02* (2013.01)

(58) Field of Classification Search
CPC .......... A47G 9/00; A47G 9/02; A47G 9/0238; A47G 9/0246; A47G 9/0253; A47G 9/0261; B25J 15/0028; B25J 15/0033
See application file for complete search history.

(56) References Cited

U.S. PATENT DOCUMENTS

| | | | | |
|---|---|---|---|---|
| 359,617 A * | 3/1887 | Leonard | ............... | A47C 21/028 5/489 |
| 1,140,583 A | 5/1915 | Elliott | | |
| 1,144,187 A | 6/1915 | Garren | | |
| 1,712,711 A * | 5/1929 | Morgan | ............... | A47C 21/028 5/489 |
| 5,239,741 A * | 8/1993 | Shamos | ................. | B21D 51/52 29/521 |
| 5,335,591 A * | 8/1994 | Pozar | .................... | A47G 21/106 100/116 |
| D366,399 S | 1/1996 | LaBoccetta | | |
| 5,673,446 A * | 10/1997 | Moen | .................... | A47C 21/028 5/489 |
| 6,340,037 B1 * | 1/2002 | Stafford | .............. | B65B 67/1205 141/316 |
| 6,839,923 B2 * | 1/2005 | Blessman | ............ | A47G 9/0253 5/489 |
| 7,007,324 B2 | 3/2006 | Blessman | | |
| 7,644,532 B2 * | 1/2010 | Capio | ................... | A01K 63/006 43/11 |
| 7,958,580 B2 * | 6/2011 | Zorger | ................. | A47G 9/0253 141/390 |
| 7,971,294 B1 * | 7/2011 | Murauskos | .......... | A47G 9/0253 5/489 |
| 9,713,390 B1 * | 7/2017 | Charters | ............... | A47G 9/0253 |
| 9,833,082 B1 * | 12/2017 | Rutkowski | ........... | A47G 9/0253 |
| 2006/0185086 A1 * | 8/2006 | Lucas | ................... | A47C 21/028 5/489 |

* cited by examiner

*Primary Examiner* — Robert G Santos
*Assistant Examiner* — David R Hare

(57) ABSTRACT

A pillowcase changing device for facilitating the changing of pillowcases includes a pair of grabbers. Each grabber comprises a frame. A field is coupled to and extends between an inner perimeter of the frame. A plurality of tines and a handle are coupled to and extend from an outer perimeter of the frame. The handle is positioned on the frame such that the handle is configured to be grasped in a hand of a user. The pair of grabbers is configured to position singly adjacent to a top face and a bottom face of a pillow. The handles are positioned on the frames such that the handles are positioned to motivate the frames into a substantially closed configuration. The pillow is compressed between the pair of grabbers such that respective tines are interlockingly positioned. The pillow is insertable into and extractable from a pillowcase.

13 Claims, 4 Drawing Sheets

PILLOWCASE CHANGING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art including information disclosed under 37 CFR 1.97 and 1.98

The disclosure and prior art relates to changing devices and more particularly pertains to a new changing device for facilitating the changing of pillowcases.

BRIEF SUMMARY OF THE INVENTION

An embodiment of the disclosure meets the needs presented above by generally comprising a pair of grabbers. Each grabber comprises a frame. A field is coupled to and extends between an inner perimeter of the frame. A plurality of tines and a handle are coupled to and extend from an outer perimeter of the frame. The handle is positioned on the frame such that the handle is configured to be grasped in a hand of a user. The pair of grabbers is configured to position singly adjacent to a top face and a bottom face of a pillow. The handles are positioned on the frames such that the handles are positioned to motivate the frames into a substantially closed configuration. The pillow is compressed between the pair of grabbers such that respective tines are interlockingly positioned. The pillow is insertable into and extractable from a pillowcase.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
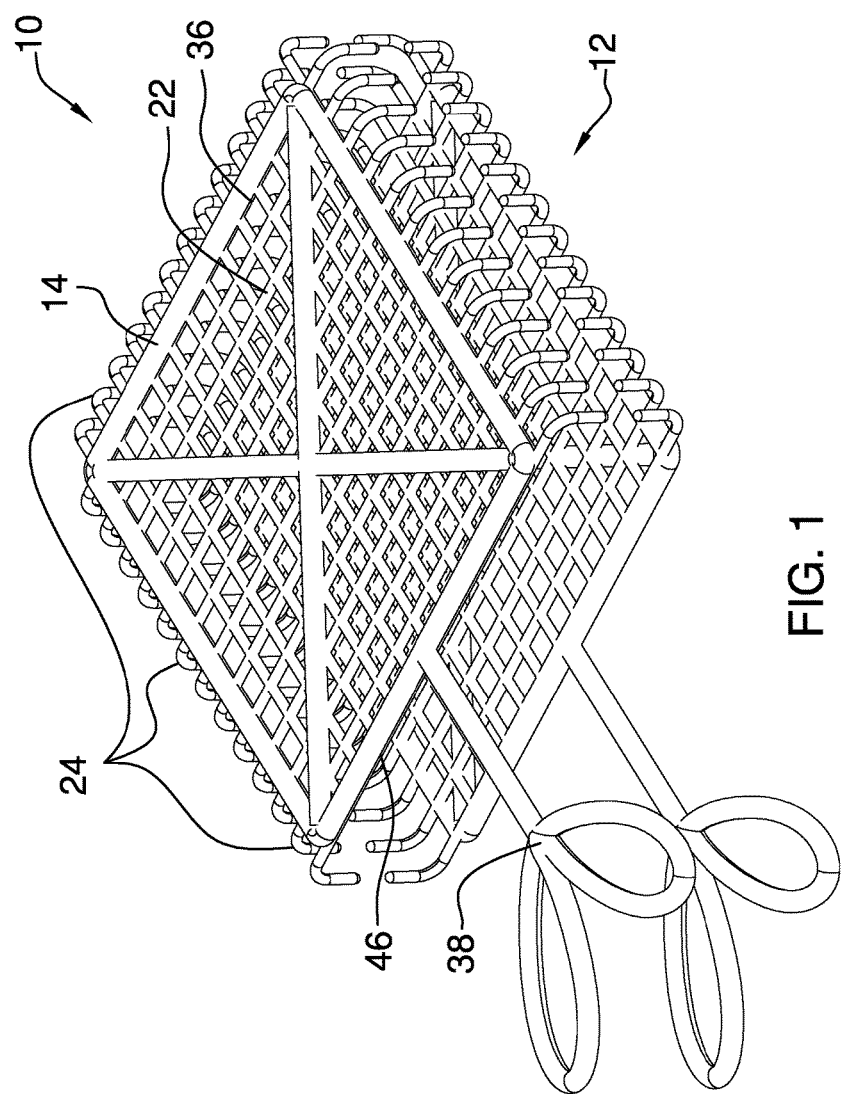
FIG. 1 is an isometric perspective view of a pillowcase changing device according to an embodiment of the disclosure.
Figure 2:
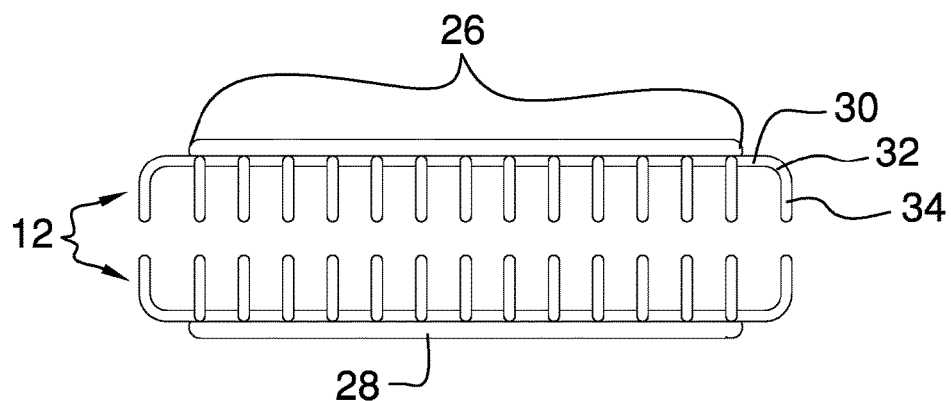
FIG. 2 is a front view of an embodiment of the disclosure.
Figure 3:
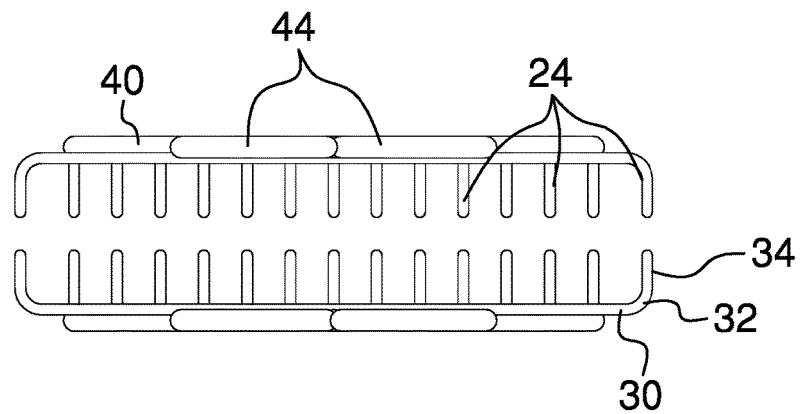
FIG. 3 is a back view of an embodiment of the disclosure.
Figure 4:
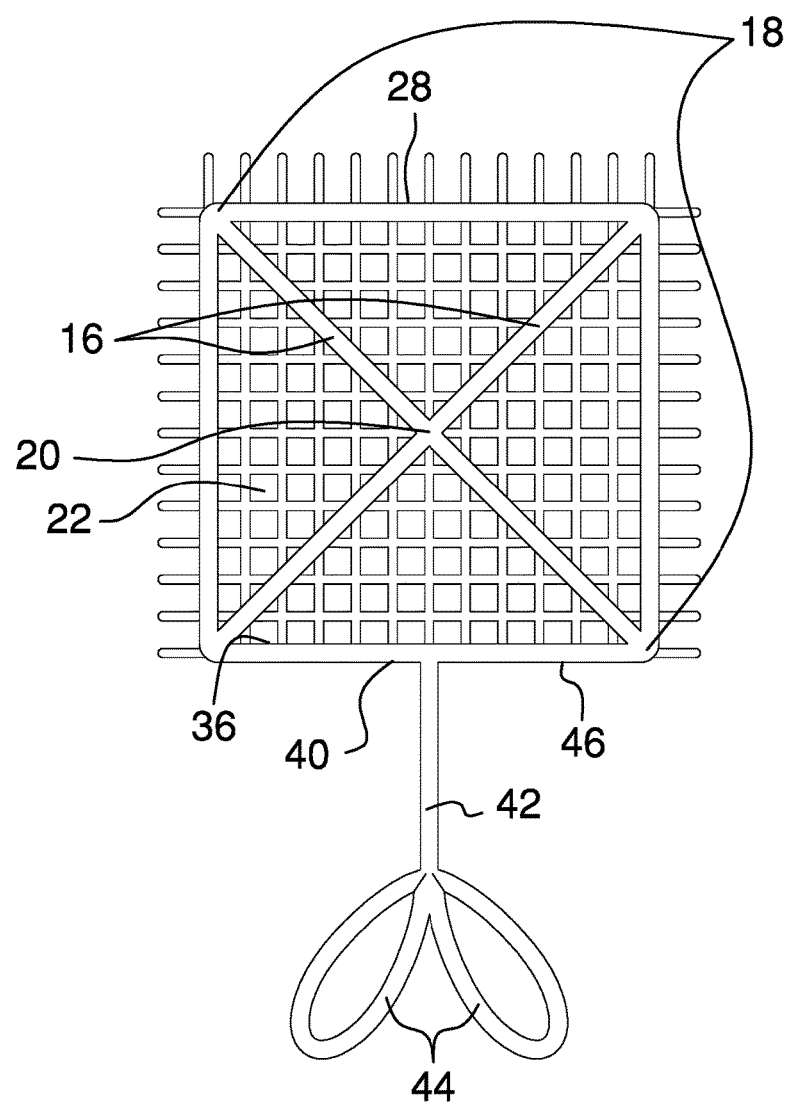
FIG. 4 is a bottom view of an embodiment of the disclosure.
Figure 5:
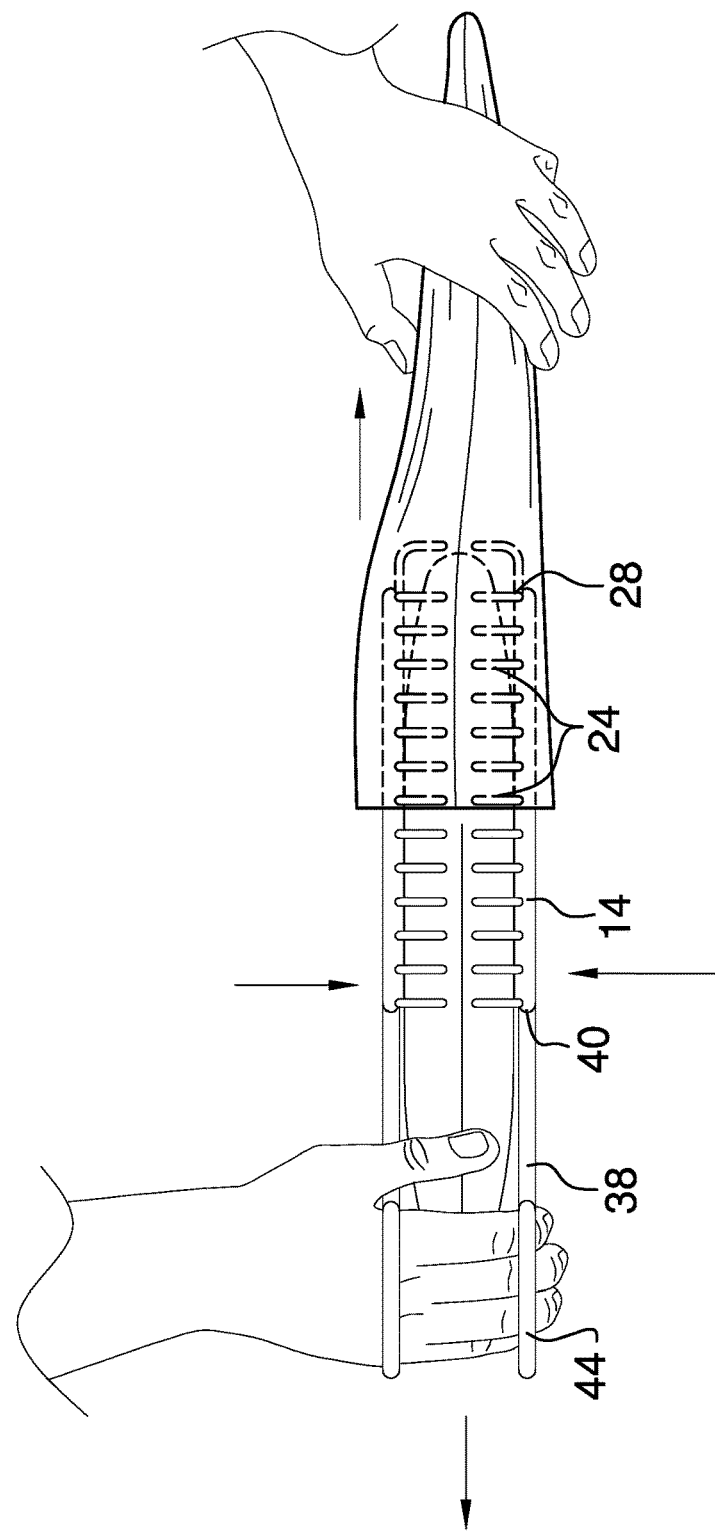
FIG. 5 is an in-use view of an embodiment of the disclosure.

With reference now to the drawings, and in particular to FIGS. 1 through 5 thereof, a new changing device embodying the principles and concepts of an embodiment of the disclosure and generally designated by the reference numeral 10 will be described.

As best illustrated in FIGS. 1 through 5, the pillowcase changing device 10 generally comprises a pair of grabbers 12. Each grabber 12 comprises a frame 14. In one embodiment, the frame 14 is rectangularly shaped. In another embodiment, the frame 14 is squarely shaped. In yet another embodiment, each of a pair of stiffeners 16 is coupled to and extends between opposing corners 18 of the frame 14. The stiffeners 16 intersect proximate to a center 20 of the frame 14.

A field 22 is coupled to and extends between an inner perimeter 36 of the frame 14. In one embodiment, the field 22 is meshed.

A plurality of tines 24 is coupled to and extends from an outer perimeter 46 of the frame 14. In one embodiment, the tines 24 are positioned on opposing side edges 26 and a leading edge 28 of the frame 14. In one embodiment, each tine 24 comprises a first section 30, a second section 32 and a third section 34. The first section 30 is coupled to and extends substantially perpendicularly from the outer perimeter 46. The first section 30 is substantially coplanar with the frame 14. The second section 32 is coupled to the first section 30 distal from the frame 14. In another embodiment, the second section 32 is arcuate. The third section 34 is coupled to the second section 32 distal from the first section 30. The third section 34 is positioned on the second section 32 such that the third section 34 is substantially perpendicular to the frame 14.

A handle 38 is coupled to and extends from the outer perimeter 46 of the frame 14. The handle 38 is positioned on the frame 14 such that the handle 38 is configured to be grasped in a hand of a user. The handle 38 is positioned on a trailing edge 40 of the frame 14. In one embodiment, the handle 38 comprises a rod 42 that is coupled to and extends substantially perpendicularly from the trailing edge 40. The rod 42 is substantially coplanar with the frame 14. Each of a pair of rings 44 is coupled to and extends from the rod 42 distal from the frame 14. The rings 44 are substantially coplanar with the frame 14. In another embodiment, the rings 44 are substantially ovally shaped.

In one embodiment, the grabbers 12 comprise plastic. In another embodiment, the grabbers 12 comprise aluminum tubing.

In use, the pair of grabbers 12 is configured to position singly adjacent to a top face and a bottom face of a pillow. The handles 38 are positioned on the frames 14 such that the handles 38 are positioned to motivate the frames 14 into a substantially closed configuration. The pillow is compressed between the pair of grabbers 12 such that respective tines 24 are interlockingly positioned. The pillow is insertable into and extractable from a pillowcase.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pillowcase changing device comprising a pair of grabbers, each said grabber comprising:
    a frame;
    a field coupled to and extending between an inner perimeter of said frame;
    a plurality of tines coupled to and extending from an outer perimeter of said frame;
    a handle coupled to and extending from said outer perimeter of said frame, wherein said handle is positioned on said frame such that said handle is configured for grasping in a hand of a user; and
    wherein said pair of grabbers configured for positioning singly adjacent to a top face and a bottom face of a pillow, wherein said handles are positioned on said frames such that said handles are positioned to motivate said frames into a substantially closed configuration, wherein the pillow is compressed between said pair of grabbers such that respective said tines are interlockingly positioned, wherein the pillow is insertable into and extractable from a pillowcase.

2. The device of claim 1, further including said frame being rectangularly shaped.

3. The device of claim 2, further including said frame being squarely shaped.

4. The device of claim 1, further including a pair of stiffeners, each said stiffener being coupled to and extending between opposing corners of said frame such that said stiffeners intersect proximate to a center of said frame.

5. The device of claim 1, further including said field being meshed.

6. The device of claim 1, further including said tines being positioned on opposing side edges and a leading edge of said frame.

7. The device of claim 6, further including each said tine comprising:
    a first section coupled to and extending substantially perpendicularly from said outer perimeter, said first section being substantially coplanar with said frame;
    a second section coupled to said first section distal from said frame, said second section being arcuate;
    and a third section coupled to said second section distal from said first section; and
    wherein said third section is positioned on said second section such that said third section is substantially perpendicular to said frame.

8. The device of claim 1, further including said handle being positioned on a trailing edge of said frame.

9. The device of claim 8, further including said handle comprising:
    a rod coupled to and extending substantially perpendicularly from said trailing edge, said rod being substantially coplanar with said frame; and
    a pair of rings coupled to and extending from said rod distal from said frame, said rings being substantially coplanar with said frame.

10. The device of claim 9, further including said rings being substantially ovally shaped.

11. The device of claim 1, further including said grabbers comprising plastic.

12. The device of claim 1, further including said grabbers comprising aluminum tubing.

13. A pillowcase changing device comprising a pair of grabbers, each said grabber comprising:
    a frame, said frame being rectangularly shaped, said frame being squarely shaped;
    a pair of stiffeners, each said stiffener being coupled to and extending between opposing corners of said frame such that said stiffeners intersect proximate to a center of said frame;
    a field coupled to and extending between an inner perimeter of said frame, said field being meshed;
    a plurality of tines coupled to and extending from an outer perimeter of said frame, said tines being positioned on opposing side edges and a leading edge of said frame, each said tine comprising a first section, a second section and a third section, said first section being coupled to and extending substantially perpendicularly from said outer perimeter, said first section being substantially coplanar with said frame, said second section being coupled to said first section distal from said frame, said second section being arcuate, said third section being coupled to said second section distal from said first section, wherein said third section is positioned on said second section such that said third section is substantially perpendicular to said frame;
    a handle coupled to and extending from said outer perimeter of said frame, wherein said handle is positioned on said frame such that said handle is configured for grasping in a hand of a user, said handle being positioned on a trailing edge of said frame, said handle comprising:
        a rod coupled to and extending substantially perpendicularly from said trailing edge, said rod being substantially coplanar with said frame, and a pair of rings coupled to and extending from said rod distal from said frame, said rings being substantially coplanar with said frame, said rings being substantially ovally shaped;

said grabbers comprising plastic, said grabbers comprising aluminum tubing; and wherein said pair of grabbers configured for positioning singly adjacent to a top face and a bottom face of a pillow, wherein said handles are positioned on said frames such that said handles are positioned to motivate said frames into a substantially closed configuration, wherein the pillow is compressed between said pair of grabbers such that respective said tines are interlockingly positioned, wherein the pillow is insertable into and extractable from a pillowcase.

* * * * *